April 21, 1959          J. L. HERR          2,883,164
IMMERSION HEATER
Filed Aug. 27, 1956
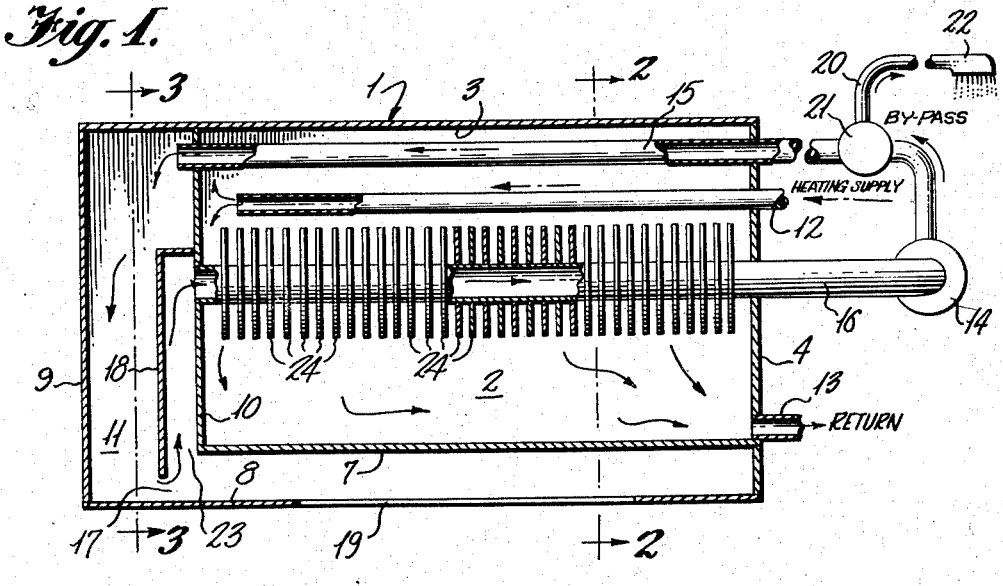
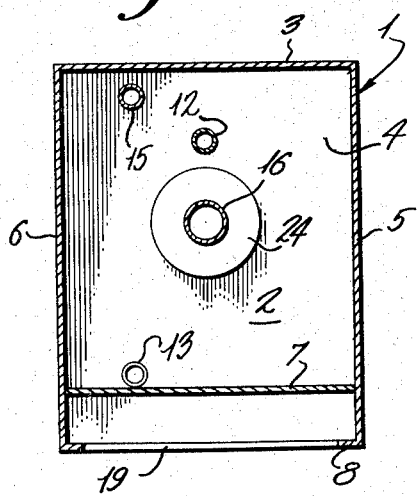
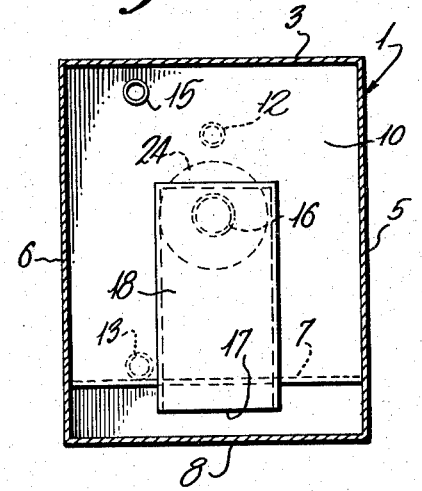
INVENTOR
John Lee Herr
BY
Mason, Fenwick & Lawrence
ATTORNEYS

2,883,164
IMMERSION HEATER

John Lee Herr, Nottingham, Pa., assignor to Herr and Futty, Inc., Nottingham, Pa., a corporation of Delaware Application August 27, 1956, Serial No. 606,332

2 Claims. (Cl. 257—215)

This invention relates to an immersion heater of that type which embodies a heating chamber and a heated chamber, conductively related, in which each chamber has heat conductive conduit connections adapting it, the one to be intercalated in a circuit for a heating fluid, and the other, being a part of a circulation system for the liquid to be heated.

One of the objects of the invention is to provide an immersion heater of the type described, in which the heated chamber is provided with an opening in its outer wall for placing it in communication with the body of liquid in which it is submerged, said conduit connections being discontinuous adjacent said opening whereby make-up liquid to be heated is admitted to said circulation system to replace heated liquid discharged from said system.

Another object of the invention is to provide an immersion heater in which the conduit connections of the heated chamber pass through said chamber in heat exchanging relation to the heating fluid within said chamber, communicating at different levels with said heated chamber, the induction conduit connections communicating with said heated chamber at a point adjacent the opening in its outer wall whereby cold liquid from without said heater is directly entrained in the flow of heated liquid passing into said induction conduit connection.

Still another object of the invention is to provide an immersion heater of the type described, particularly designed for increasing the fluidity of a localized portion of an extensive body of viscous liquid, such as molasses, in which it is submerged, the localized portion being confined to that portion immediately within and adjacent the heater, in the interest of conservation of heat and reduction in the time required to increase the fluidity to the point at which circulation of the viscous liquid becomes practicable.

Other objects of the invention will appear as the following description of a practical embodiment thereof proceeds.

In the drawing which accompanies and forms a part of the following specification, and throughout the figures of which the same reference characters have been employed to denote identical parts:

Figure 1 is a longitudinal sectional view of an immersion heater, embodying the principles of the present invention, the heater being shown associated with a pump circulation system including a valve controlled discharge;

Figure 2 is a cross-section through the heater, taken along the line 2—2 of Figure 1;

Figure 3 is a cross-section taken along the line 3—3 of Figure 1.

Referring now in detail to the figures, the numeral 1 represents the casing as a whole, which may be of any desired shape, but is here shown as being in the form of a rectangular prism. Said casing is partitioned within to form a heating chamber 2, having the top wall 3 coinciding with the top wall of the casing, a front end wall 4 coinciding with the front wall of the casing, side walls 5 and 6, which coincide with the side walls of the casing, a bottom wall 7, which is spaced above the bottom wall 8 of the casing, and a rear end wall 10 spaced from the adjacent end wall 9 of the casing. The heating chamber 2 consequently occupies the upper part of the casing, with space beneath its bottom wall 7 and laterally of its rear end wall 9. This space forms a viscous liquid chamber 11. The walls of the casing itself and of the heating chamber 2 are heat conductive, so that the viscous liquid within the viscous liquid chamber 11 is heated by conduction through the walls of the heating chamber, and the ambient viscous liquid adjacent the outside of the casing is also warmed. The heating chamber 2 is supplied with the heating medium through conduit connections 12 and 13, which extend through the front wall 4 and lead from an extraneous source of heat which may be a steam boiler, an internal combustion engine, a water or air heater, or the like. The inlet conduit 12 is at a higher level than the outlet conduit 13, and extends longitudinally through the heating chamber, terminating short of the rear wall 9. The outlet conduit 13 opens adjacent the front wall 4. The heating medium discharged from the conduit connection 12 circulates both in an upward and downward direction, and discharges by way of the conduit connection 13. Thus, while in operation, the heating chamber is at all times filled with circulating hot medium which moves in contact with all of its walls.

The viscous liquid chamber 11 forms part of a circulatory system, being connected to the pump 14 by the eduction and induction conduits 15 and 16, which pass longitudinally through the heating chamber preferably at different levels, entering through the front wall 4, and opening at the far side of the rear wall 9. The terms "eduction" and "induction," as applied to these conduits, relate to their functions with respect to the pump. The eduction conduit 15 opens directly into the upper part of the portion of the viscous liquid chamber which lies laterally adjacent the rear wall of the heating chamber. The induction conduit has a downwardly extending limb 18, within the lateral portion of the viscous liquid chamber, which extends to the level of the bottom of the heating chamber but falls short of reaching the bottom wall 8 of the casing, whereby a passage 17 is provided, affording communication between the lateral portion of the viscous liquid chamber and the mouth of the induction conduit 16. The downwardly extending limb 18 of the induction conduit may be of any shape, but is here shown as comprising an open bottomed rectangular compartment spaced at its lower end from the casing wall 8. Said wall 8 is provided with a capacious opening 19, giving access to the cold molasses to the interior of the casing.

In its normal functioning the pump delivers molasses to the viscous liquid chamber through the conduit 15, and sucks it back through the passage 17, between limb 18 and wall 10, and the induction conduit 16. The pump 14 on its eduction side is provided with a discharge conduit 20 controlled by a valve 21, which conduit leads to a suitable device for making use of the heated molasses, such as the spray nozzle 22. If the valve 21 is closed so that no molasses is being discharged, the pump recirculates the molasses through the heater, so that it becomes more and more fluid. Normally, it will be recirculated to suitably reduce its viscosity prior to the opening of the valve 21.

The mouth 23 of the conduit 16 is closely adjacent the opening 19 in the bottom of the tank, so that if molasses is being discharged through the spray nozzle, a make-up quantity of cold molasses will be drawn in through the opening 19 and become entrained in the heated molasses passing upward through the conduit 16. On its way to the mouth 23, said cold molasses will move in contact with the bottom wall of the heating chamber, and during its passage through the conduit 16 it will be intimately associated with the warm molasses in said conduit and will also come into contact with the walls of the conduit 16 so that it will be appreciably heated and become a substantially homogeneous part of the molasses being discharged. In order to operate with optimum efficiency, the conduit 16 is of larger cross-sectional area than the eduction conduit 15, so as to accommodate a certain proportion of cold molasses entrained through the mouth 23, even at times when the valve 21 is closed. The conduit 16 is also preferably provided with the fins 24, increasing its heat exchanging capacity.

It will be understood from the above description that in order to reduce the viscosity of the liquid to the point at which the pump can handle it, it is not necessary to heat the entire bulk of molasses in the surrounding tank (not shown) but that the heating effect is substantially confined to the very small quantity of molasses occupying the heater and the conduits between the heater and the pump. The recurrent circulation of the molasses and the heating medium ensures that the desired fluidity of the molasses will be attained within a short period of time.

While I have in the above description disclosed what has been found to be a practical embodiment of the invention, it will be understood by those skilled in the art that the specific details of construction and arrangement of parts, as shown, are by way of example and not to be construed as limiting the scope of the invention.

What I claim is:

1. Immersion heater for reducing the viscosity of a localized small portion of a body of normally viscous liquid in a tank, said heater comprising a casing adapted to be mounted in a tank of said liquid near the bottom, transverse and vertical conductive partitions within said casing respectively spaced from the bottom wall and one end of said casing defining with the contiguous casing walls a heating chamber in the upper part of said casing, and a viscous liquid chamber below said heating chamber having a vertical limb between said vertical partition and the adjacent end wall of said casing, the bottom wall of said casing having an opening therethrough of extensive area, beneath said heating chamber, means for connecting said heating chamber into a circuit for heated fluid derived from an external source, heat exchanging viscous liquid conduits at different levels extending longitudinally through said heating chamber and opening into the vertical limb of said viscous liquid chamber through said vertical partition, a pump having its eduction and induction ends connected respectively to the higher and lower level conduits, a discharge pipe communicating with the eduction conduit, a cut-off valve in said discharge pipe, a partition fixed to the exterior face of said vertical partition overlying the outlet of said induction conduit forming with said vertical partition an extension of said induction conduit, terminating short of the bottom wall of said casing and being adjacent the extensive opening in the bottom wall of said casing.

2. Immersion heater as claimed in claim 1, the bottom wall of said casing lying in a horizontal plane, and the cross-sectional area of said conduit extension being smaller than that of said induction conduit.

References Cited in the file of this patent

UNITED STATES PATENTS

| | | |
|---|---|---|
| 1,723,082 | Schumann | Aug. 6, 1929 |
| 1,770,936 | Mantle | July 22, 1930 |
| 2,112,690 | Chapman | Mar. 29, 1938 |
| 2,324,615 | Damrow | July 20, 1943 |
| 2,454,286 | Lerner | Nov. 23, 1948 |
| 2,522,948 | Hoffman | Sept. 19, 1950 |